July 25, 1950  M. WERNLI  2,516,817
PIPE CUTTER
Filed June 6, 1947
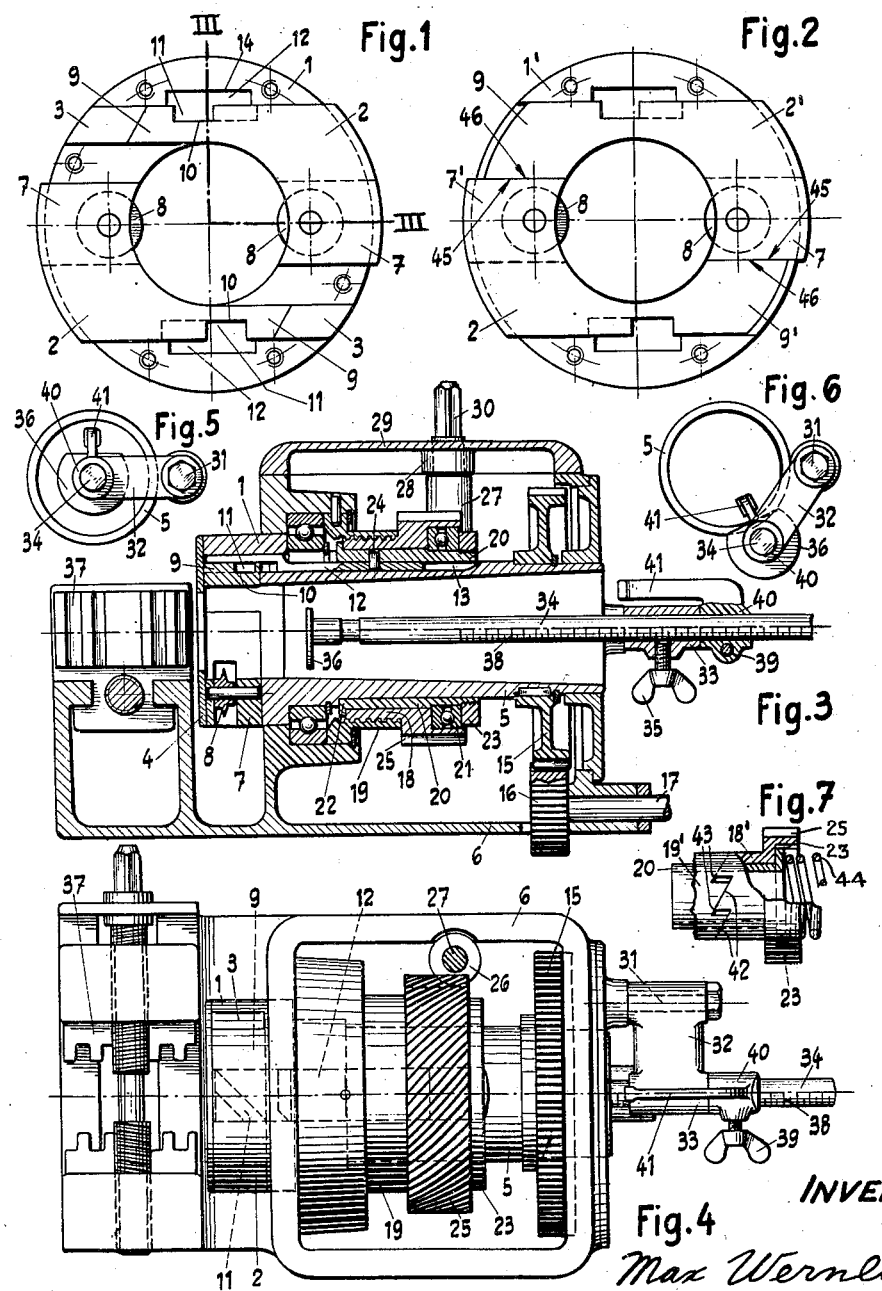

Patented July 25, 1950

2,516,817

UNITED STATES PATENT OFFICE 2,516,817

PIPE CUTTER

Max Wernli, Schaffhausen, Switzerland, assignor to Société Anonyme des Aciéries ci-devant Georges Fischer, Schaffhausen, Switzerland Application June 6, 1947, Serial No. 753,019
In Switzerland May 4, 1946

Section 1, Public Law 690, August 8, 1946
Patent expires May 4, 1966

1 Claim. (Cl. 164—60)

My present invention relates to pipe cutters having two diametrically opposed cutting tools.

The cutting tools in prior-art pipe cutters of this class are mounted on slides which are adjustably movable in transverse guide recesses provided in the cutter head, or the cutting tools are secured to pivoted tool holders by means of which they may be displaced relative to the work.

The pipe cutter according to my present invention belongs to that class wherein the two diametrically opposite cutting tools are mounted on slides which are guided in cutter-head recesses. According to a main feature of the invention, the said slides are angularly adapted, i. e. they comprise two leg portions each. On one of the latter, the cutting tool is mounted, and the other is provided with a groove disposed at an angle to the cutter-head axis. Two diametrically opposite slide keys are mounted longitudinally displaceable in grooves provided on the hollow cutter-head spindle, and each thereof is provided on its forward or head portion with a skew lug adapted to be a sliding fit in the said groove in the one slide-leg portion. The said keys may be longitudinally displaced by means of a bush mounted on the hollow cutter-head spindle, so as to move the said slides and cutting tools toward or away from each other. Such inventive arrangement affords a positive guiding of the slide keys and a relatively small diameter of the cutter head.

Two embodiments of the invention, including a modified detail arrangement, are shown, by way of example, in the accompanying drawing, in which Fig. 1 shows a first form of cutter head in elevation, the face cover-plate having been removed;

Fig. 2, similar to Fig. 1, a second form of cutter head;

Fig. 3 a vertical section through the entire apparatus, on line A—A of Fig. 1,

Fig. 4 a top plan view of the apparatus shown in Fig. 3, the top cover plate having been removed;

Fig. 5 a rear elevation of an abutment device projecting into the hollow cutter-head spindle, and defining the length of the pipe sections to be cut off, Fig. 6 a rear elevation of the abutment device illustrated in Fig. 5, but in deflected position, and Fig. 7 a top plan view of a modified detail.

The cutter head is designated by 1, and the two diametrically opposite slides by 2. The latter, as seen from the cutter-head face, are angularly adapted, and are slidable in the cutter-head guide recesses 3. In the latter, the slides 2 are retained by means of a cover plate 4 (Fig. 3) which is secured to the cutter head 1. A hollow spindle 5 is rigidly connected to the latter and is journalled for rotation in the machine case 6, but axially immovable. The cutting tools 8, adapted as cutting rolls, are journaled in the legs 7 of the slides 2. The other legs 9 of the slides 2, on their radially outward side, are provided with grooves 10 which are oblique relative to the cutter head axis, and in which skew lugs 11 integral with the slide keys 12 are engaged. The latter are slidably engaged in the longitudinal grooves 13 of the hollow spindle 5 (Fig. 3), and those portions of the keys which are provided with the skew lugs 11, are slidably guided in the grooves 14 of cutter head 1. By longitudinally displacing the keys 12, the slides 2 are moved in the opposite direction transversely of the cutter-head axis. A gear wheel 15 is keyed to hollow spindle 5 and meshes with a pinion 16 which is keyed to the driving shaft 17. The latter is journaled in machine case 6.

The keys 12 are longitudinally displaced by means of a movable bush 18 which, in the present case, is adapted as an externally threaded bush. The threads of bush 18 are engaged by a nut 19 which is abutted against the machine case and secured against an axial as well as a rotary movement. A cylindrical liner 20, as well as a ball bearing 21 (adapted as thrust bearing) are provided in bush 18. The front end of the latter abuts against a peripheral flange or lug 22 provided on the front end of liner 20. The ball bearing 21 provided at the rear end of bush 18 abuts against a radially projecting collar 23 fastly mounted on liner 20. The keys 12 are connected to liner 20 by pins 24 so as to take part in a longitudinal displacement of liner 20, but prevent a rotation of the latter relative to hollow spindle 5. A worm wheel 25 is integral with bush 18, and is driven by a worm 26 disposed at right angles to hollow spindle 5. Wheel 26 is pinned to a driving shaft 27 which is journaled in the machine case 6 at one end and in a bearing 28 of the cover plate 29 at the other end. Cover plate 29 is mounted detachably on machine case 6. The shaft end 30 projecting above cover plate 29, is square to permit of securing a handwheel or crank thereto.

A threaded pin 31, parallel to hollow spindle 5, is threaded into the rear side of machine case 6, and serves as pivot for an arm 32. The latter may be fixed in different angular positions by tightening pin 31, and is provided on its free end with a boss 33. The latter is bored parallel to pin 31 to receive a rod 34 which is securable against axial displacement by means of a wing screw 35 engaged in boss 33. The distance between the center axis of pin 31 and that of the bore in boss 33 corresponds to the distance between the former axis and that of hollow spindle 5 so that the axis of rod 34 coincides with the longitudinal axis of spindle 5 when arm 32 is in a corresponding pivotal position. An abutment disc 36 is secured to the forward end of rod 34. A vice 37 disposed in front of cutter head 1 and secured to machine case 6, serves for clamping the pipe to be cut. The abutment disc 36 mounted on rod 34 serves as stop for the clamped pipe, and defines the length of the pipe section to be cut off. A scale 38 is provided on rod 34 to permit of adjusting the latter relative to boss 33 of arm 32. An adjustable abutment 40, securable by a wing nut 39, is provided on rod 34, rearward of the rear face of boss 33. Abutment 40 is provided with an arm 41 which projects forward and above boss 33. When sections have to be cut off the pipe clamped in vice 37, of greater length than the existing distance between the forward face of boss 33 on arm 32 and the cutting rolls 8 mounted in the slides 2, wing nut 35 is slacked and rod 34 pushed back, until abutment disc 36 abuts against the forward face of boss 33, upon which nut 35 is tightened again. Pin 31 then is slacked, and arm 32 turned so as to swing abutment disc 36 away from hollow spindle 5. By longitudinally displacing abutment 40 on rod 34 to the rear, and subsequently re-tightening same, sections of comparatively great length may be cut off the pipe. When tightening abutment 40, the latter is so adjusted that arm 41 is situated inside the imaginary extension of hollow spindle 5 (see Fig. 6).

Fig. 7 shows a second form of arrangement for displacing the slides 2. The bush 18', at its end facing the fixed nut 19', is provided with a multiple left-handed thread. The individual threads 42, which are made short, abut against the threads 43 of nut 19', which latter threads also are made short. The rear face of bush 18' abuts against the collar 23 which is provided on the rear side of liner 20. A spring 44 bears on the rear side of collar 23, and the other end of spring 44 abuts against gear wheel 15. The operation of this embodiment is similar to that of Figs. 1–3.

Fig. 2 shows a form of the slide 2' (displaceable in cutter head 1' by virtue of lugs 11 of keys 12 being engaged in grooves 10 of legs 9' of slides 2' which differs from the one described above. In this modified form, only one guide recess is provided in cutter head 1 for the two slides 2. The flanks 45 of the legs 7', in which latter the cutter rolls 8 are journaled, abut against the inner flanks 46 of the slide-legs 9'.

Cutting tools adapted as parting tools may be mounted on the legs 7' of the slides 2', in place of the cutting rolls 8.

What I claim and desire to secure by Letters Patent is:

A pipe cutter of the class described, comprising a machine case, a cutter head having a hollow spindle rotatively carried by said case, a pair of diametrically opposite slides guided in recesses of the said head for displacement at right angles to the axis of the said head and hollow spindle, each of said slides having a pair of angularly disposed legs, a pair of diametrically opposite cutting tools each mounted on one leg of each slide, the other leg of the latter extending in a tangential direction to said hollow spindle and being provided with grooves extending obliquely to the said axis, a pair of slide keys guided with their rear portion in longitudinal grooves of the said hollow spindle, the said keys in their front portion being provided with lugs which extend in the direction of and into cooperation with the said grooves in the slide legs, said keys being mounted on a bush mounted on the said hollow spindle and adapted to longitudinally displace the said keys for the purpose of moving the said slides and tools away from or toward each other and means to longitudinally displace said bush.

MAX WERNLI.

REFERENCES CITED

The following references are of record in the file of this patent:

UNITED STATES PATENTS

| Number | Name | Date |
|---|---|---|
| Re. 20,974 | Guirl et al. | Jan. 10, 1939 |
| 1,258,663 | Eddy | Mar. 12, 1918 |
| 1,782,692 | Lawson | Nov. 25, 1930 |
| 2,057,011 | Corwin | Oct. 13, 1936 |
| 2,261,214 | Bierman | Nov. 4, 1941 |